(12) United States Patent
Brignac et al.

(10) Patent No.: US 12,216,092 B2
(45) Date of Patent: Feb. 4, 2025

(54) ULTRASONIC TESTING PROBE, COUPLANT DELIVERY SYSTEM, AND ULTRASONIC TESTING APPARATUS

(71) Applicant: Westinghouse Electric Company LLC, Cranberry Township, PA (US)

(72) Inventors: Jacques L. Brignac, Simsbury, CT (US); George R. Rowland, Winsted, CT (US); Glenn G. Hart, Jr., Suffield, CT (US); Bruce A.P. Farver, Windsor Locks, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 312 days.

(21) Appl. No.: 17/755,568

(22) PCT Filed: Oct. 29, 2020

(86) PCT No.: PCT/US2020/057932
§ 371 (c)(1),
(2) Date: May 2, 2022

(87) PCT Pub. No.: WO2021/087095
PCT Pub. Date: May 6, 2021

(65) Prior Publication Data
US 2022/0365039 A1      Nov. 17, 2022

Related U.S. Application Data

(60) Provisional application No. 62/929,278, filed on Nov. 1, 2019.

(51) Int. Cl.
*G01N 29/265*      (2006.01)
*G01N 29/04*        (2006.01)
(Continued)

(52) U.S. Cl.
CPC ......... *G01N 29/265* (2013.01); *G01N 29/043* (2013.01); *G01N 29/225* (2013.01);
(Continued)

(58) Field of Classification Search
USPC .......................................................... 73/627
See application file for complete search history.

(56) References Cited

U.S. PATENT DOCUMENTS 4,449,411 A * 5/1984 Suhr ...................... G01N 27/82
                                                                     324/226
5,025,215 A * 6/1991 Pirl ...................... G01N 29/225
                                                                     73/866.5
(Continued)

FOREIGN PATENT DOCUMENTS

WO        0225241 A2      3/2002
WO    2021087095 A1      5/2021

OTHER PUBLICATIONS

International Search Report and Written Opinion for International PCT Application No. PCT/US2020/057932, dated Feb. 8, 2021.

*Primary Examiner* — Clayton E. LaBalle
*Assistant Examiner* — Warren K Fenwick
(74) *Attorney, Agent, or Firm* — K&L Gates LLP

(57) ABSTRACT

An ultrasonic testing probe operable to perform an ultrasonic inspection on a workpiece, the workpiece having an interior region. The testing probe comprises a support; an ultrasonic testing element that is structured to generate an ultrasonic output that is directed toward the workpiece and to receive an ultrasonic input from the workpiece that is responsive to the ultrasonic output, the ultrasonic testing element being movably situated on the support; a motor apparatus structured to be electrically connected with a control apparatus, the motor apparatus comprising a motor that is connected with the ultrasonic testing element and is structured to rotate the ultrasonic testing element with (Continued)

respect to the support; and a bladder that is structured to be movable between an initial state and an expanded state, the expanded bladder structured to be engaged with the workpiece within the interior region and to center the support in the interior region.

12 Claims, 3 Drawing Sheets

(51) Int. Cl.
  *G01N 29/22* (2006.01)
  *G01N 29/26* (2006.01)
  *G01N 29/28* (2006.01)
(52) U.S. Cl.
  CPC .......... *G01N 29/262* (2013.01); *G01N 29/28* (2013.01); *G01N 2291/102* (2013.01); *G01N 2291/106* (2013.01); *G01N 2291/2636* (2013.01)

(56) References Cited

U.S. PATENT DOCUMENTS

| | | | | |
|---|---|---|---|---|
| 5,100,610 A | * | 3/1992 | Pirl | F28F 11/02 |
| | | | | 376/310 |
| 5,268,940 A | * | 12/1993 | Roseveare | G21C 17/003 |
| | | | | 376/249 |
| 2015/0260690 A1 | * | 9/2015 | Rasselkorde | G01N 29/28 |
| | | | | 73/623 |

* cited by examiner

ULTRASONIC TESTING PROBE, COUPLANT DELIVERY SYSTEM, AND ULTRASONIC TESTING APPARATUS

CROSS-REFERENCE TO RELATED APPLICATIONS

This application is a U.S. National Stage Entry under 35 U.S.C. § 371 of International Patent Application No. PCT/US2020/057932, entitled ULTRASONIC TESTING PROBE, COUPLANT DELIVERY SYSTEM, AND ULTRASONIC TESTING APPARATUS, filed Oct. 29, 2020, which claims benefit under 35 U.S.C. § 119 (e) to U.S. Provisional Application No. 62/929,278, filed Nov. 1, 2019 entitled ULTRASONIC TESTING PROBE, COUPLANT DELIVERY SYSTEM, AND ULTRASONIC TESTING APPARATUS. The contents of which are incorporated by reference herein.

FIELD

The present disclosure relates to ultrasonic testing probes, couplant delivery systems, and ultrasonic testing apparatuses.

BACKGROUND

Certain structures, such as steam generators of fossil-fueled power plants and other structures, are in need of periodic inspection. However, portions of such structures are sometimes inaccessible for one reason or another. In the example of a fossil-fired steam generator, a plurality of tubes are mounted to a tube sheet, but only the interior surfaces of the tubes are accessible for inspection purposes. As such, ultrasonic testing methodologies have been employed from the accessible interior surface in order to ascertain properties such as the amount of wall material that has been lost due to degradation and to detect failures such as cracking, corrosion, and the like. Previous ultrasonic methodologies have typically involved manually moving an ultrasonic sensor of the type that includes a number of ultrasonic emitters and a number of ultrasonic detectors (e.g., one or more), wherein the number of ultrasonic emitters would generate ultrasonic energy that is directed toward a workpiece, such as the interior surface of a tube of a generator, and the ultrasonic detectors would detect reflected ultrasonic signals responsive to the emitted ultrasonic signals from the ultrasonic emitters.

SUMMARY

Disclosed herein is an ultrasonic testing probe operable to perform an ultrasonic inspection on a workpiece, the workpiece having an interior region. The ultrasonic testing probe comprises a support; an ultrasonic testing element that is structured to generate an ultrasonic output that is directed toward the workpiece and to receive an ultrasonic input from the workpiece that is responsive to the ultrasonic output, the ultrasonic testing element being movably situated on the support; a motor apparatus structured to be electrically connected with a control apparatus, the motor apparatus comprising a motor that is being connected with the ultrasonic testing element and is structured to rotate the ultrasonic testing element with respect to the support; and a bladder that is structured to be movable between an initial state and an expanded state, the bladder in the expanded state being structured to be engaged with the workpiece within the interior region and to center the support in the interior region.

It is understood that the inventions described in the present disclosure are not limited to the examples summarized in this Summary. Various other examples are described and exemplified herein.

BRIEF DESCRIPTION OF THE DRAWINGS

Various features of the embodiments described herein are set forth with particularity in the appended claims. The various embodiments, however, both as to organization and methods of operation, together with advantages thereof, may be understood in accordance with the following description taken in conjunction with the accompanying drawings as follows:

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Figure 1:
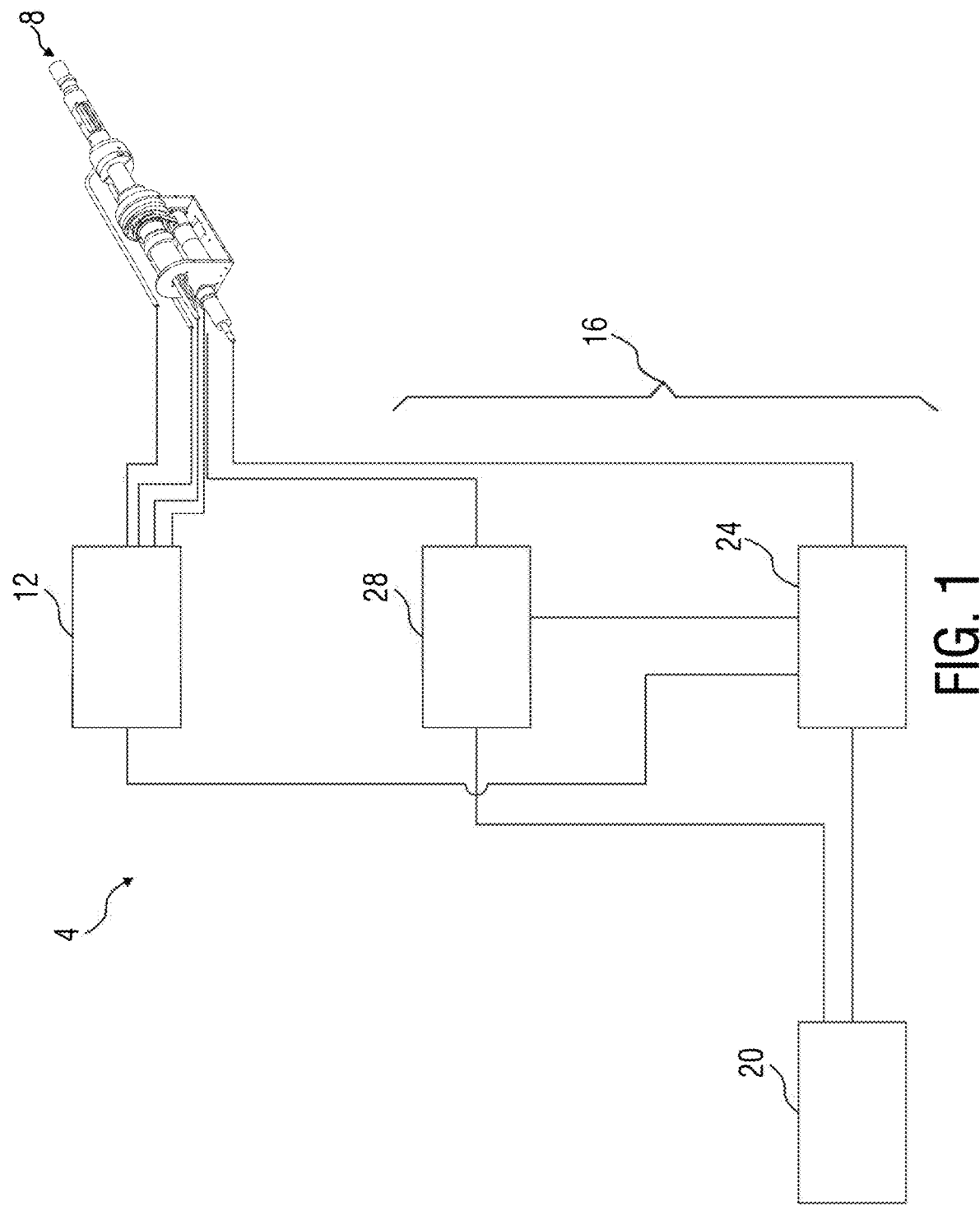
FIG. 1 is a partial schematic and partial perspective view of an ultrasonic testing apparatus of the present disclosure.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms. As used herein, the term "number" shall be used to refer to any non-zero integer quantity, i.e., one or any integer greater than one (e.g., 1, 2, 3, . . . ).

As employed herein, the expression "a number of" and variations thereof shall refer broadly to any non-zero quantity, including a quantity of one.

Ultrasonic testing methodologies typically have additionally required the use of some type of couplant between the ultrasonic sensor and the surface of the workpiece. Couplant materials typically have included fluids such as water, hair gel, and any of a variety of other materials that acoustically couple the ultrasonic sensor with the workpiece. Such couplant material typically has been manually applied either to the workpiece or to the ultrasonic sensor, or both. While the ultrasonic sensor typically had been manually moved among various positions on the workpiece, more recently such ultrasonic sensors have been robotically operated to move them with respect to the workpiece.

An improved ultrasonic testing apparatus 4 in accordance with the present disclosure is depicted generally in FIG. 1. The ultrasonic testing apparatus 4 can include an ultrasonic testing probe 8 that is likewise in accordance with the present disclosure. The ultrasonic testing apparatus 4 can further include an automated couplant delivery system 12 that is in accordance with the present disclosure and which can be connectable with the ultrasonic testing probe 8. The ultrasonic testing apparatus 4 further can be said to include a control apparatus 16 that includes a laptop computer 20 to which are connected a motion control unit 24 and a phased array acquisition unit 28. As will be noted elsewhere herein, the couplant delivery system 12 can include a control box 84, and it is noted that any one or more of the laptop computer 20, the motion control unit 24, the phased array acquisition unit 28, and the control box 84 can include a processor or a storage or both, with the storage having stored therein instructions in the form of routines which, when executed on the processor, will cause the ultrasonic testing apparatus 4 to perform various operations such are set forth elsewhere herein.

The ultrasonic testing probe 8 is usable to perform an ultrasonic testing operation on a workpiece 32 and, in particular, can be received in an interior region of the workpiece 32 which, in the depicted exemplary embodiment, is in the form of a hollow tube. The workpiece is shown both in solid lines spaced from the ultrasonic testing probe 8 and is shown in dashed lines to illustrate the ultrasonic testing probe 8 received in the interior region of the workpiece 32. The workpiece 32 may be mounted to a tube sheet which is not shown for reasons of clarity and simplicity.

The ultrasonic testing probe 8 can be said to include a support 36 that includes a probe wand 40 and a frame 44, with the probe wand 40 being situated on the frame 44. The ultrasonic testing probe 8 can further include a linear phased array probe 48 that is movably situated on the probe wand 40 and that is connected via a shaft with a DC servomotor/encoder 52. The DC servomotor/encoder 52 can be connected via a motor/encoder cable 56 with the motion control unit 24. Responsive to instructions received from the motion control unit 24 based upon software that is operable on the motion control unit 24 or on the laptop computer 20 or both, the DC servomotor/encoder 52 can be energized to cause a rotation of the shaft to, in turn, rotate the linear phased array probe 48 with respect to the respect wand 40. An encoder portion of the DC servomotor/encoder 52 can output a number of electronic pulses with such rotation, wherein each pulse is representative of a predetermined angular rotation of the DC servomotor/encoder 52 with respect to the frame 44. A belt drive can couple the DC servomotor/encoder 52 with the shaft that operates the linear phased array probe 48. A 385° limiter mechanism 58 can limit rotation of the linear phased array probe 48 to a total movement of 385° of rotation with respect to the probe wand 40, at which point the motion can be stopped by a physical stop in order to prevent breakage of data cables that extend between the linear phased array probe 48 and a phased array probe cable 54 of the ultrasonic testing probe 8 that is electrically connected with the phased array acquisition unit 28. The aforementioned software, e.g., in the form of instructions and/or routines, can cause the linear phased array probe 48 to rotate with respect to the probe wand 40 and to generate an ultrasonic output that is directed toward the workpiece 32 and to receive an ultrasonic input from the workpiece 32 that is responsive to the ultrasonic output. The ultrasonic outputs can be communicated via the phased array probe cable 54 to the phased array acquisition unit 28 and thereafter to the laptop computer 20, and elsewhere, as appropriate. It should be noted that outer housing, which can optionally be located as indicated by reference character 50, is not shown for clarity.

Figure 2:
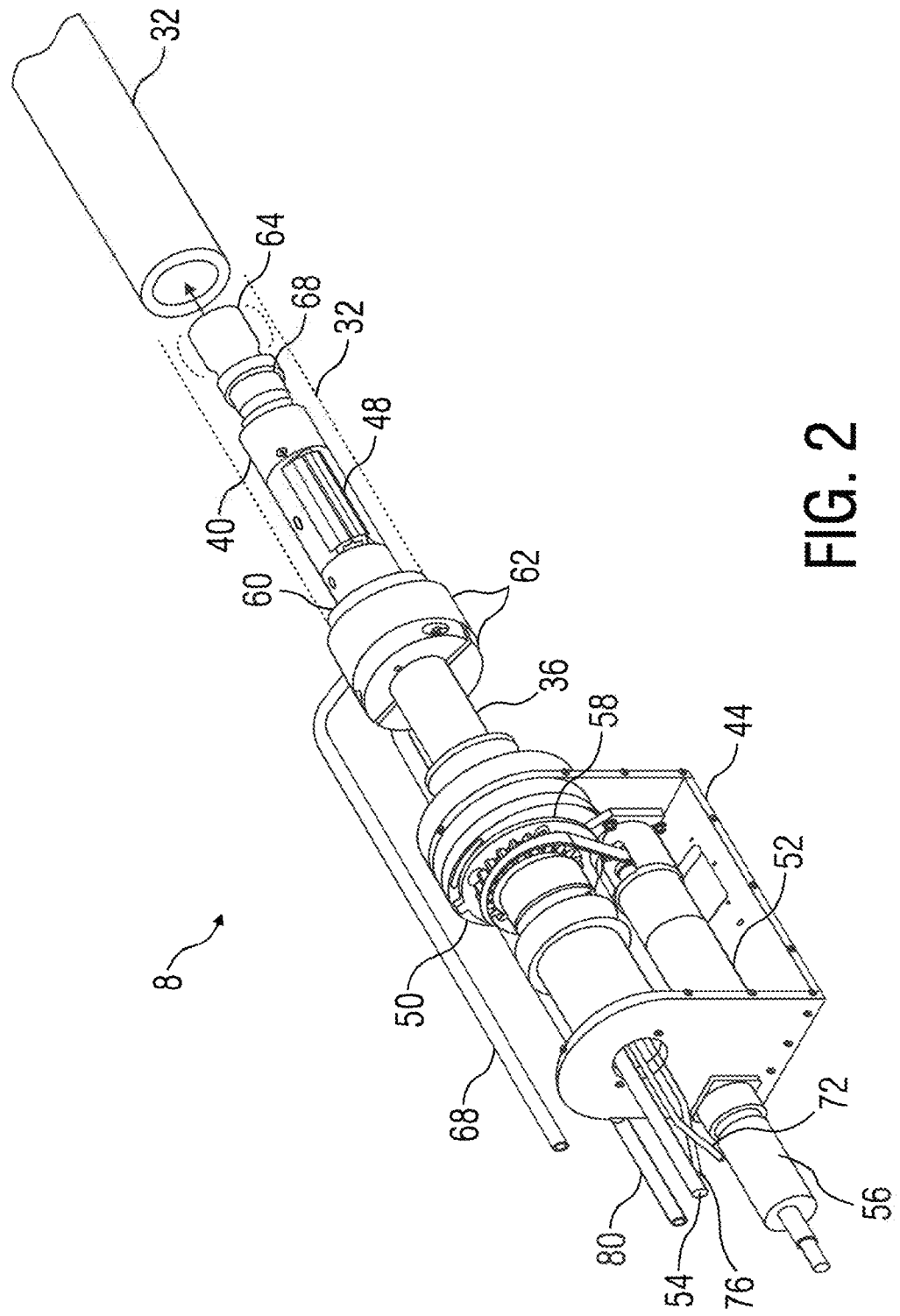
FIG. 2 is a perspective view of an ultrasonic testing probe of the present disclosure.

The ultrasonic testing probe 8 can further be said to include a tube end water seal 60 and a waterbox and linear probe position lock 62, with the waterbox and linear positioning lock 62 being situated on the probe wand 40, and with the tube end water seal 60 being situated on the waterbox and linear probe position lock 62. The ultrasonic testing probe 8 can further include an inflatable sealing bladder 64 at a free end thereof spaced from the tube end water seal 60. The bladder 64 can be pneumatically inflatable between an initial state wherein its interior is at atmospheric pressure, or at least a reduced pressure, and an expanded state wherein the interior of the bladder 64 is pneumatically or otherwise inflated to be in an expanded state at an increased pressure in excess of atmospheric pressure, such as is indicated in dashed lines in FIG. 2, wherein the bladder 64 compressively engages an interior surface of the workpiece 32.

It thus can be understood that the end of the probe wand 40 that can include the bladder 64 and the portion of the probe wand 40 that extends between the bladder 64 and the tube end water seal 60 is received in the open end of the workpiece until the tube end water seal 60 is engaged with the edge of the workpiece 32. In such a position, the tube end water seal 60 can be manually compressively retained against the edge of the workpiece 32, at least initially. The bladder 64 can then be expanded in order to cause the bladder to engage the inner surface of the workpiece 32, which holds the ultrasonic testing probe 8 in such position within the workpiece 8, such that the ultrasonic testing probe 8 no longer needs to be manually held in such position. This results in the expanded bladder 64 and the tube end water seal 60 forming an enclosed region 68 between them that is bounded between an exterior surface of the probe wand 40 and the interior surface of the workpiece 32. Such enclosed region 68 is generally airtight and watertight within the operable ranges contemplated by the disclosed and claimed concept.

Figure 3:
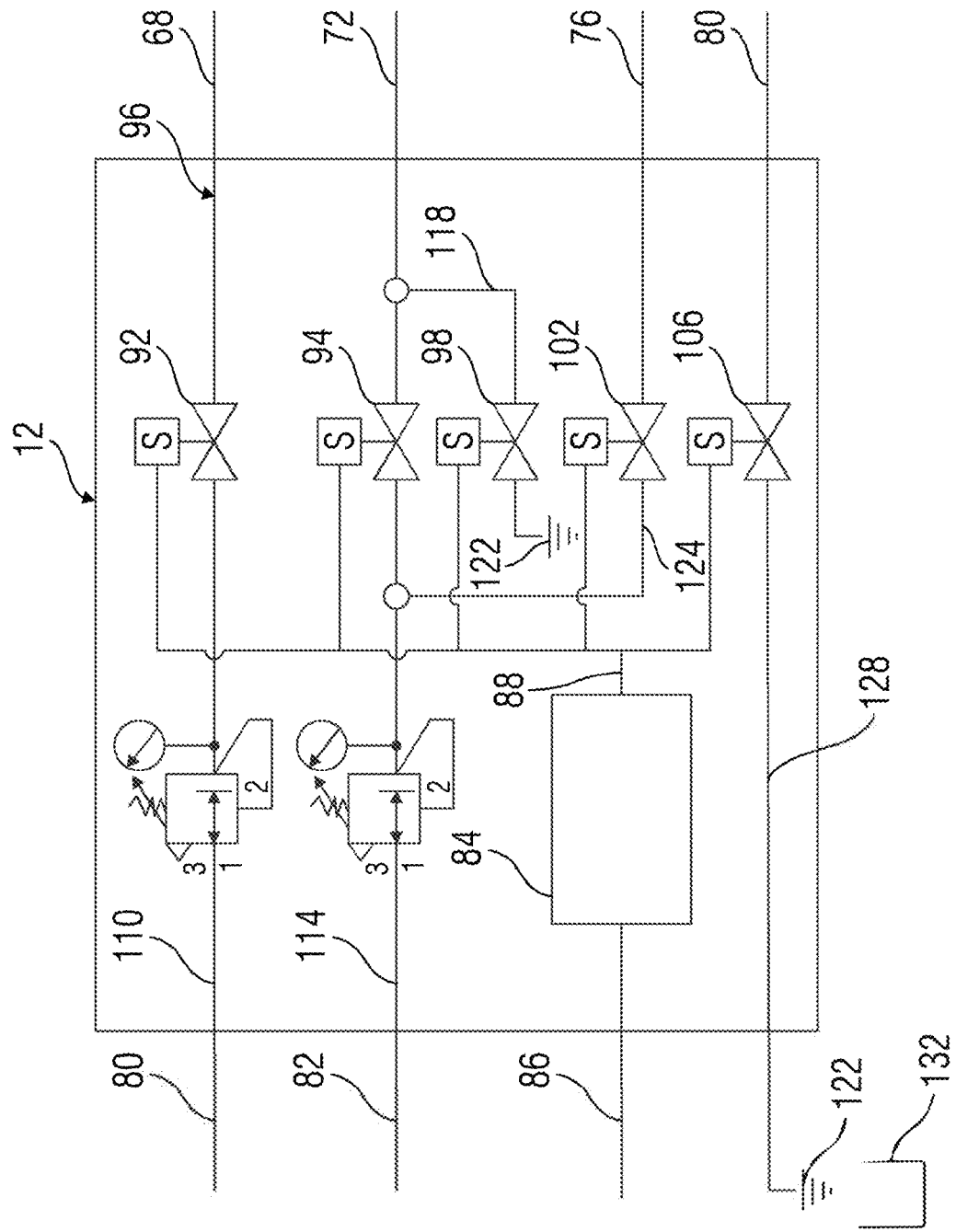
FIG. 3 is a schematic view of couplant delivery systems of the present disclosure.

The ultrasonic testing probe 8 can further include a bladder air in/out connector 72, a water evacuation air connector 76, an evacuated water connector 80, and a water-to-water box connector 68, all of which are connectable with the couplant delivery system 12. As can be understood from FIG. 3, the couplant delivery system 12 can be additionally connectable with a couplant supply 80 and an air supply 82. In the depicted exemplary embodiment, the couplant supply 80 can include a supply of water or other appropriate couplant that is suitable for use with the ultrasonic testing probe. In the depicted exemplary embodiment, the air supply 82 is a source of compressed air, e.g., a source of air that is at an increased pressure that is in excess of atmospheric pressure.

As noted hereinbefore, the couplant delivery system 12 can further include a control box 84, and the control box 84 can be connectable via an electrical connector 86 with the motion control unit 24, it being noted that the motion control unit 24 can also include a software control system. The control box 84 can be connected via a set of connectors 88 with a solenoid-operated couplant valve 92, a number of solenoid-operated air valves that are indicated at the numerals 94, 98, and 102, and a solenoid-operated drain valve 106, any one or more of which may be referred to herein as a solenoid-operated valve, and all of which are a part of the couplant delivery system 12. It is noted that the precise configuration of valves shown is exemplary and various combinations of, for example, 2-way and 3-way valves could be used with appropriate modifications to the connections shown. Software that is operable on the laptop computer 20 or on the control box 84 or both is operable to operate the various solenoid-operated valves noted hereinbefore in order to cause the ultrasonic testing apparatus 4 to perform useful operations on the workpiece 32.

For instance, the couplant supply 80 may be at an increased pressure. e.g., in excess of atmospheric pressure, and the solenoid-operated couplant valve 92 can be opened to permit an amount of the couplant material from the couplant supply 80 to be provided via a couplant supply line 110 to the open solenoid-operated drain valve 92 and thereafter to the water-to-water box connector 68. In such a scenario, the couplant supply 80, the couplant supply line 110, the solenoid-operated couplant valve 92, the water-to-water box connector 68, and the control box 84 can together be said to form a couplant delivery system 96 that is usable to provide an amount of the couplant material to the linear phased array probe 48 or the workpiece 32 or both. In the depicted exemplary embodiment, however, the more complex couplant delivery system 12 includes the couplant delivery system 96 and includes other systems that perform the exemplary operations that are described herein on the workpiece 32.

In the depicted exemplary embodiment, and in order to perform an ultrasonic testing operation on the workpiece 32, the free end of the probe wand 40 is received in the open end of the workpiece 32 when the bladder 64 is in its initial state, e.g., free state or relaxed state. The probe wand 40 is received into the interior regions 32 of the workpiece 32 until the tube end water seal 60 is compressively received against the end of the workpiece 32. The automated portion of the inspection procedure is then initiated by providing a predetermined input to the control box 84, such as by actuating a button or otherwise providing an electronic input. The further operations that are noted herein-below are performed by the control box 84 or by the control apparatus 16, or both, by software that is stored thereon and that is executed on processors thereof.

Upon such initiation of the automated portion of the inspection operation, the solenoid-operated air valves 98 and 102 are closed (if they previously had been open), and the solenoid-operated air valve 94 is opened to permit the air from the air supply 82 to travel through an air supply line 114 past the solenoid-operated air valve 94 and into the bladder air in/out connector 72 in order to inflate the bladder 64 by moving it from the initial state to the expanded state in which it compressively engages the interior surface of the workpiece 32. The solenoid-operated air valve 94 is then closed, and since the bladder 64 is compressively engaged with the interior surface of the workpiece 32, any compressive force that had been manually applied to the ultrasonic testing probe 8 in order to receive it into the workpiece and to compressively engage the tube end water seal 60 with the end of the workpiece 32 can be removed. The bladder 64 in the expanded condition thus retains the ultrasonic testing probe in a fixed position within the interior of the workpiece 32 and centers the probe wand 40 and the linear phased array probe 48 within the interior of the workpiece 32. The tube end water seal 60 is of a conic shape, and it likewise centers the probe wand 40 and the linear phased array probe 48 within the interior of the workpiece 32.

Subsequent thereto, the solenoid-operated couplant valve 92 can be opened to permit an amount of the couplant to be received from the couplant supply 80 through the connection tube 110 into the water-to-water box connector 68 and into the enclosed region 68, thereby filling the enclosed region 68. In so doing, it may be desirable to open the solenoid-operated drain valve 106 in order to permit air within the enclosed region 68 that is displaced by the amount of couplant that is received in the enclosed region 68 to be drained through a drain connector 128 that is in communication with the atmosphere 122. Once the enclosed region 68 is filled with the couplant material 80, the solenoid-operated drain valve 106, if it had been opened, can be now closed 106. Again, all of the operations that are described herein as being performed by the solenoid-operated valves are controlled by the control box 84 or by the control apparatus 16, or both.

Once the enclosed region 68 is filled with the couplant material, the control box 84 can communicate a signal to the motion control unit 24 to rotate the linear phased array probe 48 through a revolution in order to perform an ultrasonic testing operation. In so doing, the motion control unit 24 may send an instruction to the phased array acquisition unit 28 or elsewhere to energize the ultrasonic emitters of the linear array phased probe 48 as appropriate based upon output from the encoder portion of the DC servomotor/encoder 52. In this regard, the operations might include, by way of example, a full rotation of the linear phased array probe 48 with recording of the received responsive ultrasonic signals at certain rotational positions responsive to pulses that are output by the encoder 52, or still alternatively the motor portion of the DC servomotor/encoder 52 may be energized until a predetermined rotational position of the linear phased array probe 48 is achieved based upon the pulses received from the encoder 52, at which point the linear phased array probe 48 may be energized to generate an ultrasonic output at that position that is directed at the workpiece 32 and from which input ultrasonic acoustic signals are detected that are responsive to the ultrasonic output. Such signals can be recorded at the phased array acquisition array unit 28 or at the laptop computer 20 or both, or elsewhere. In this regard, it is understood that additional software on the control apparatus 16 controls the operation of the linear phased array probe 48 and the DC servomotor/encoder 52 in order to perform the ultrasonic testing operation.

Subsequent to the completion of the ultrasonic testing operation by the linear phased array probe 48, the solenoid-controlled drain valve 106 can be opened, and the solenoid-operated air valve 102 will likewise be opened in order to provide, via the air channel 124 that is connected with the air channel 114, an amount of compressed air to the water evacuation air connector 76 in order to displace the couplant, i.e., water in the depicted exemplary embodiment, that is currently within the enclosed region 68, and to cause such evacuated couplant to flow out of the drain tube 128 and into a receptacle 132. Subsequent thereto, the solenoid-operated air valve 98 can be opened in order to permit the compressed air that is within the interior of the bladder 64 to be exhausted through the air channel 118 and thereafter to the atmosphere 122. The ultrasonic testing probe 8 can subsequent thereto be removed from the workpiece 32 and can be inserted into another workpiece 32, after which the aforementioned operations can be repeated. Such removal and replacement of the ultrasonic testing probe 8 can be performed manually or potentially could be performed robotically by other software and an appropriate actuator.

It is reiterated that all of the operations mentioned herein that are performed by the solenoid-operated valves are controlled by the control box 84 or by the motion control unit 24, or by the phased array acquisition unit 28, or by the laptop computer 20, or any one or more in cooperation. By performing the delivery of couplant to the enclosed region 68 and by evacuating it in an automated fashion, in conjunction with operation of the linear phased array probe 48, the inspection process is greatly simplified and its speed is dramatically increased compared with solely manual operations. Also, by providing sufficient valves and tubes to permit the evacuated couplant to be received in the receptacle 132, an undesirable mess is avoided. Additionally, by operating the various solenoid-operated air valves in order to expand the bladder 64, and thereafter to purge the couplant from the enclosed region 68 into the receptacle 132, and thereafter to vent the pressurized air that is in the bladder 64 to the atmosphere, all in an automated fashion, the technician that is operating the ultrasonic testing apparatus 4 need not perform the various operations on couplant, air, linear array phased probe 48, and drain that would otherwise be required in the absence of the automation of such operations that is provided by the control box 84 and the control apparatus 6.

It thus can be seen that the couplant delivery system 12 automates the provision and removal of couplant as part of an ultrasonic testing operation, and it can further be seen that the ultrasonic testing probe 8 can be configured to be received in the end of the workpiece 32 and to be usable to automatically perform an ultrasonic testing operation on the workpiece 32 without further operation by the technician, other than by receiving the probe wand 40 in the end of the workpiece 32 with some compressive force and then initiating the testing operation, although this too can be automated. As such, the system increases speed, reduces cost, and improves repeatability due to the standard fashion in which the probe wand 40 is received in the interior region of the work-piece 32 and retained therein, and the ultrasonic testing operation is performed. Other benefits will be apparent.

Various aspects of the subject matter described herein are set out in the following examples.

Example 1—An ultrasonic testing probe operable to perform an ultrasonic inspection on a workpiece, the workpiece having an interior region, the ultrasonic testing probe comprising: a support; an ultrasonic testing element that is structured to generate an ultrasonic output that is directed toward the workpiece and to receive an ultrasonic input from the workpiece that is responsive to the ultrasonic output, the ultrasonic testing element being movably situated on the support; a motor apparatus structured to be electrically connected with a control apparatus, the motor apparatus comprising a motor that is being connected with the ultrasonic testing element and is structured to rotate the ultrasonic testing element with respect to the support; and a bladder that is structured to be movable between an initial state and an expanded state, the bladder in the expanded state being structured to be engaged with the workpiece within the interior region and to center the support in the interior region.

Example 2—The ultrasonic testing probe of example 1, wherein the motor apparatus includes an encoder that is structured to generate a number of pulses responsive to a rotation of the motor, and wherein the control apparatus is structured to record at least a portion of the ultrasonic output responsive to at least some of the number of pulses.

Example 3—The ultrasonic testing probe of example 1 or 2, wherein the bladder is pneumatically inflatable between the initial state and the expanded state.

Example 4—The ultrasonic testing probe of any of examples 1-3, wherein the support comprises a seal that is structured to engage the workpiece, and wherein the bladder is situated on the support at a location spaced from the seal, the ultrasonic testing element being situated between the seal and the bladder.

Example 5—The ultrasonic testing probe of any of examples 1-4, wherein the support further comprises a couplant connection, the couplant connection being structured to be connected with a couplant supply of a couplant delivery system.

Example 6—The ultrasonic testing probe of any of examples 1-5, wherein the support further comprises a number of air connections, an air connection of the number of air connections being in fluid communication with the bladder, the air connection being structured to be connected with an air supply of the couplant delivery system.

Example 7—The ultrasonic testing probe of example 6 wherein the support comprises a seal that is structured to engage the workpiece, and wherein the bladder is situated on the support at a location spaced from the seal, the ultrasonic testing element being situated between the seal and the bladder, another air connection of the number of air connections being in fluid communication with the support, the air connection being structured to be connected with the air supply of the couplant delivery system.

What is claimed is:

1. An ultrasonic testing probe operable to perform an ultrasonic inspection on a workpiece, the workpiece having an interior region, the ultrasonic testing probe comprising:
   a support:
   an ultrasonic testing element that is structured to generate an ultrasonic output that is directed toward the workpiece and to receive an ultrasonic input from the workpiece that is responsive to the ultrasonic output, the ultrasonic testing element being movably situated on the support;
   a motor apparatus structured to be electrically connected with a control apparatus, the motor apparatus comprising a motor that is being connected with the ultrasonic testing element and is structured to rotate the ultrasonic testing element with respect to the support; and
   a bladder that is structured to be movable between an initial state and an expanded state, the bladder in the expanded state being structured to be engaged with the workpiece within the interior region and to center the support in the interior region; and
   wherein the support comprises a seal that is structured to engage an end of the workpiece, and wherein the bladder is situated on the support at a location spaced from the seal, the ultrasonic testing element being situated between the seal and the bladder.

2. The ultrasonic testing probe of claim 1 wherein the motor apparatus includes an encoder that is structured to generate a number of pulses responsive to a rotation of the motor, and wherein the control apparatus is structured to record at least a portion of the ultrasonic output responsive to at least some of the number of pulses.

3. The ultrasonic testing probe of claim 1 wherein the bladder is pneumatically inflatable between the initial state and the expanded state.

4. The ultrasonic testing probe of claim 1 wherein the support comprises a seal that is structured to engage the workpiece, and wherein the bladder is situated on the support at a location spaced from the seal, the ultrasonic testing element being situated between the seal and the bladder.

5. The ultrasonic testing probe of claim 1 wherein the support further comprises a couplant connection, the couplant connection being structured to be connected with a couplant supply of a couplant delivery system.

6. The ultrasonic testing probe of claim 1 wherein the support further comprises a number of air connections, an air connection of the number of air connections being in fluid communication with the bladder, the air connection being structured to be connected with an air supply of a couplant delivery system.

7. The ultrasonic testing probe of claim 6 comprising another air connection of the number of air connections being in fluid communication with the support, the air connection being structured to be connected with the air supply of the couplant delivery system.

8. An ultrasonic testing probe operable to perform an ultrasonic inspection on a workpiece, the workpiece having an interior region, the ultrasonic testing probe comprising:
   a support;
   an ultrasonic testing element that is structured to generate an ultrasonic output that is directed toward the workpiece and to receive an ultrasonic input from the workpiece that is responsive to the ultrasonic output, the ultrasonic testing element being movably situated on the support;
   a motor apparatus structured to be electrically connected with a control apparatus, the motor apparatus comprising a motor that is being connected with the ultrasonic testing element and is structured to rotate the ultrasonic testing element with respect to the support; and
   a bladder that is structured to be movable between an initial state and an expanded state, the bladder in the expanded state being structured to be engaged with the workpiece within the interior region and to center the support in the interior region;
   wherein the support comprises a number of air connections, an air connection of the number of air connections being in fluid communication with the bladder, the air connection being structured to be connected with an air supply of a couplant delivery system.

9. The ultrasonic testing probe of claim 8 wherein the motor apparatus includes an encoder that is structured to generate a number of pulses responsive to a rotation of the motor, and wherein the control apparatus is structured to record at least a portion of the ultrasonic output responsive to at least some of the number of pulses.

10. The ultrasonic testing probe of claim 8 wherein the bladder is pneumatically inflatable between the initial state and the expanded state.

11. The ultrasonic testing probe of claim 8 wherein the support comprises a seal that is structured to engage the workpiece, and wherein the bladder is situated on the support at a location spaced from the seal, the ultrasonic testing element being situated between the seal and the bladder.

12. The ultrasonic testing probe of claim 8 wherein the support further comprises a couplant connection, the couplant connection being structured to be connected with a couplant supply of a couplant delivery system.

\* \* \* \* \*